Feb. 6, 1968    M. A. LOOK ET AL    3,367,180
SELF-ALIGNING SENSING SKID
Filed March 25, 1965
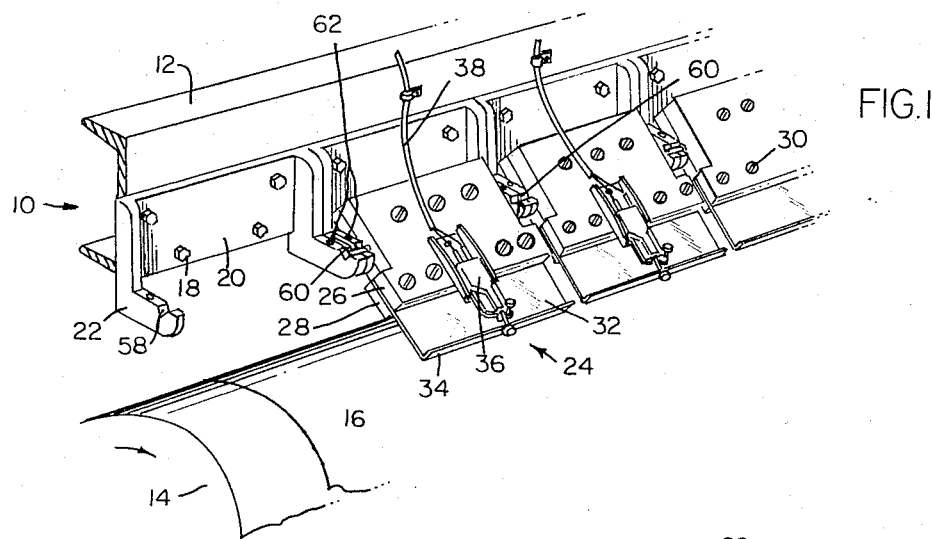
FIG.1
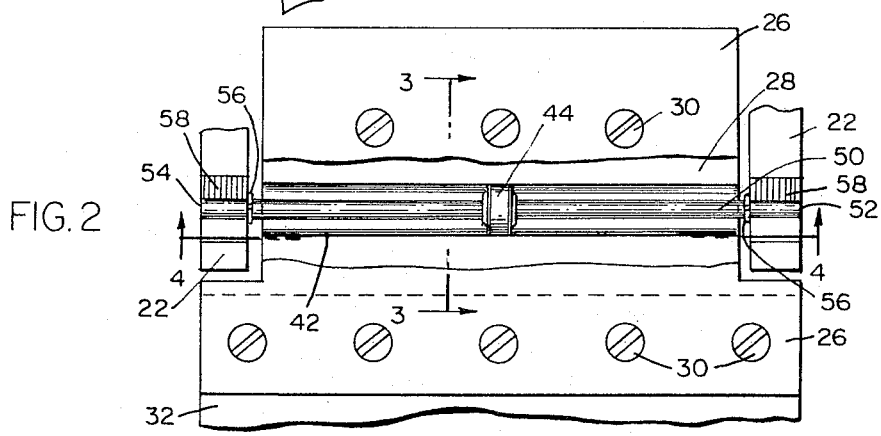
FIG.2
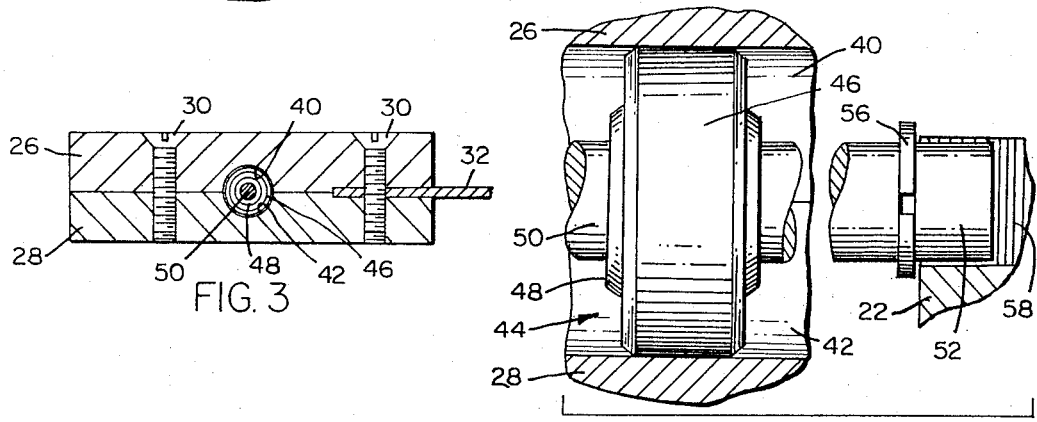
FIG.3
FIG.4
INVENTORS
MERTON A. LOOK
EUGENE BERG
BY,
Russell, Chittick & Pfund
ATTORNEYS

United States Patent Office 3,367,180
Patented Feb. 6, 1968

3,367,180
SELF-ALIGNING SENSING SKID
Merton A. Look and Eugene Berg, Westbrook, Maine, assignors to S. D. Warren Company, Boston, Mass., a corporation of Massachusetts
Filed Mar. 25, 1965, Ser. No. 442,741
1 Claim. (Cl. 73—159)

ABSTRACT OF THE DISCLOSURE

A self aligning sensing skid for caliper detectors having a center point suspension system. A spherical bearing is employed in the skid mounting system to permit three-dimensional movement of the skid and bump detector.

---

This invention relates to apparatus for detecting sudden changes in the caliper of a moving web of paper and more particularly to an improved, self aligning sensing skid for caliper detectors.

In the manufacture of fine quality paper, the caliper of the paper must be maintained within relatively strict tolerances. It has been found desirable to inspect the paper web for defects, such as, bumps and other variations in thickness which exceed the specifications for paper, immediately before the web is cut into sheets and to provide suitable apparatus for automatically sorting and separating the sheets that have defects from those that are free from defects. Various types of caliper detectors have been employed for inspecting the moving web for predetermined types of defects and for which generating an electrical signal to actuate the sorting mechanism at the proper instant to eliminate the defective sheets from the flow path of the sheets which conform to the preselected tolerances.

One such caliper detector is described in U.S. Patent 3,037,381, Grant et al., issued June 5, 1962, for a bump detector. The Grant et al. bump detector employs a pivotally mounted sensing skid having a bent, flexible metal blade or "shoe" which bears lightly against the moving web paper. The sensing skid is pivotally mounted by means of double bearings in a position above and generally slightly upstream of a web backing roll so that the skid trails on the moving web. Any vertical displacement of the flexible portion of the sensing skid caused by an abrupt change in web caliper is translated by a suitable transducer element into an electrical signal having a characteristic which represents the magnitude of the detected thickness fluctuation. This electrical signal is then used to actuate the paper sheet sorting mechanism whenever the electrical signal reaches a predetermined value.

The ultimate accuracy of the caliper detection system disclosed in the aforesaid Grant et al. patent, depends upon the tracking accuracy of the skid bearing surface or "shoe" because the electrical control signal is a function of the skid flexure. In order to obtain maximum tracking accuracy, the sensing skid shoe must conform to the backing roll of the inspection stand and in the case of a double bearing mounted skid, of the type disclosed in Grant et al., this means that the shoe must be parallel to the bearing shaft. If the bearing surface of the skid shoe is exactly parallel with the shaft or pivotal axis of the skid and this axis in turn is parallel with the axis of the backing roll, then the contacting surface of the shoe will be exactly normal to the flow direction of the moving web. However, the accurate alignment of the skid shoe in the pivotal axis of the skid in parallel relationship with the roll axis and normal to the web flow direction, is an inherently difficult and time consuming operation in which each sensing skid must be individually mounted and aligned at the particular inspection stand.

It is accordingly an object of the present invention to provide an improved, self aligning sensing skid which will accurately trail the moving paper web even though the skid bearing shaft and/or skid shoe contacting surface are misaligned with respect to the web flow direction.

It is another object of the present invention to provide an improved sensing skid for caliper detectors that is easily and inexpensively fabricated from readily available materials and which is compatible with and can be incorporated in existing caliper detection systems, without requiring extensive modification thereof.

In the accomplishment of these objects, we mount a caliper detection sensing skid of the type disclosed in the aforementioned Grant et al. patent on a bearing shaft by means of a single, spherical bearing which permits within certain limits skid rotation in any direction thereby automatically compensating for any initial misalignment of the sensing skid and/or skid contacting surface.

These objects and other objects of the present invention will be apparent from the following description of a preferred embodiment thereof, selected for purposes of illustration, and shown in the accompanying drawings, wherein:

FIG. 1 is a perspective view of a caliper detection apparatus having an improved sensing skid of the present invention mounted thereon and shown in operating relation to a moving paper web;

FIG. 2 is an enlarged plan view of a portion of one of the sensing skids shown in FIG. 1;

FIG. 3 is a view in cross-section taken along line 3—3 of FIG. 2 showing superposed skid detector plates and a portion of a detector blade; and, FIG. 4 is a view in cross-section taken along line 4—4 of FIG. 2 showing a single-spherical bearing and skid shaft journaled therein.

Turning now to the drawings and particularly to FIG. 1 thereof, there is shown in perspective view a web caliper detection apparatus indicated generally by the reference numeral 10. The caliper detection apparatus comprises a horizontal beam 12 mounted above and slightly upstream of a roll 14 which supports a moving paper web 16 and which may be either a driven roll or an idler. Attached to the horizontal beam 12 by means of bolts 18 is a series of brackets 20 each having a pair of parallel spaced horizontal arms 22 which project in a downstream direction away from beam 12 and at right angles to the axis of roll 14. The brackets 20 extend in an even line along the downstream side of the horizontal beam 12 and support a plurality of pivotally mounted sensing skids indicated generally as 24. Each sensing skid 24 has a body portion made up of two relatively thick plates 26 and 28 which are held in superposed relation by screws 30. Sandwiched between skid plates 26 and 28, is a thin, relatively flexible detector blade 32 having an integrally formed, transverse, upwardly extending web contacting lip or skid "shoe" 34 located on the distal edge thereof. Detachably mounted on skid plate 26 and in physical contact with the distal portion of the detector blade 32 is an electromechanical transducer 36 which converts the flexing motion of the detector blade into an electrical signal having a characteristic which represents the magnitude of the detector blade motion as the blade trails on the moving surface of the paper web. The electrical signals generated by transducer 36 are coupled through wires 38 to the input of an electrical circuit (not shown) which actuates the sheet sorting mechanism (not shown) whenever the input signal reaches a preselected magnitude.

Referring now to the enlarged plan view of the sensing skid 24 shown in FIG. 2 and the cross-sectional views thereof, depicted in FIGS. 3 and 4, the two sensing skid plates 26 and 28 are provided with matching semi-cylindrical grooves 40 and 42 which define a transversely extending channel within which is held a spherical bearing 44. Bearing 44 is a conventional spherical bearing having an outer race 46 and an inner race 48 into which is press fitted a shaft 50 whose ends 52 and 54 extend beyond the sides of the sensing skid 24 as illustrated in FIGS. 2 and 4. The shaft ends 52 and 54 are located, by means of snap rings 56, in V-shaped notches 58 which are cut in the skid supporting arms 22. Both ends of the skid pivot shaft 50 are securely held in the V-shaped notches 58 by means of latches 60 which are pivotally attached to bracket arms 22 by screws 62 as depicted in FIG. 1.

It will be apparent that the combination of the V-shaped notches 58 and the tightly secured latches 60 provides a stationary mounting for the skid shaft 50. Since shaft 50 is press fitted into the spherical bearing inner race 48, it can be seen that the inner race will also be fixed relative to the bracket arms 22 while the outer race 46 is free to rotate in any direction about the arcuate surface of the inner race 48 within the limits imposed by the diameter of shaft 50, the diameter of the cylindrical channel defined by grooves 40 and 42 and the design of the spherical bearing. It should be noted that the center pivot point of the spherical bearing 44 is located at the intersection of the axis of shaft 50 and the longitudinal axis of symmetry of the sensing skid 24. In order to provide a normal downward tilt for the sensing skid 24 in its operating position, as shown in FIG. 1, the intersection of the two axes is positioned at a point slightly upstream from the center of gravity of the sensing skid.

If the skid shaft 50 is accurately aligned with the axis of the backing roll 14, the outer spherical bearing race 46 and sensing skid 24 will rotate about the axis of shaft 50 as the skid shoe 34 moves up and down in trailing contact with the moving web 16. However, if the shaft is misaligned and/or if the web contacting portion of skid shoe 34 is not parallel with the backing roll axis, the skid will rotate about the center point of the spherical bearing 44 until it is aligned with the moving web i.e., with the skid shoe web contacting surface normal to the flow direction of the moving web. The rotation of the sensing skid 24 is of course limited by the parameters of shaft diameter, channel diameter and bearing design. These parameters are selected to allow sufficient movement of the sensing skid 24 about the center point of the spherical bearing 44 in order to compensate for normal installation alignment errors of the skid shaft 50 and the web contacting shoe 34 with respect to the axis of the backing roll 14.

It will be appreciated that the self aligning feature of the sensing skid 24 is an important improvement over the prior art sensing skids because it significantly reduces the relatively strict installation tolerances of the prior art skids with a concommitant reduction installation time and costs. In addition, the sensing skid of the present invention can be replaced on the line without requiring elaborate tolerance measurements in order to achieve proper alignment of the skid with the backing roll axis.

From the foregoing description, it will now be apparent to those skilled in the art that numerous minor variations of the preferred embodiment of our invention herein shown, are possible, and accordingly, it is not our intention to confine the invention to the precise form shown herein, but rather to limit it in terms of the appended claim.

Having thus described and disclosed a preferred embodiment of our invention, what we claim is new and desire to secure by Letters Patent of the United States is:

1. In a moving web caliper detection system having supporting members positioned over a moving web and from which is suspended a sensing skid in partial contact with said web, an improved sensing skid comprising: detachably secured upper and lower rigid body members having matching semi-cylindrical grooves defining a transversely extending cylindrical channel therein; a flexible detector blade secured between said body members, said blade having a portion thereof extending beyond said body members for trailing contact with said moving web; a spherical bearing positioned within said transversely extending channel with the outer bearing race releasably held between said body members; and, a shaft fitted within the inner bearing race and fixed relative thereto with the ends of said shaft being detachably secured to said supporting members.

References Cited

UNITED STATES PATENTS 3,037,381   6/1962   Grant et al. _____ 73—159
3,151,482   10/1964   Forrester et al. _____ 73—159

DAVID SCHONBERG, *Primary Examiner.*